US008474840B2

(12) United States Patent
Tsai

(10) Patent No.: US 8,474,840 B2
(45) Date of Patent: *Jul. 2, 2013

(54) COLLAPSIBLE SKATEBOARD

(75) Inventor: Shui-Te Tsai, Taipei (TW)

(73) Assignee: Razor USA, LLC, Cerritos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/441,741

(22) Filed: Apr. 6, 2012

(65) Prior Publication Data

US 2012/0193883 A1 Aug. 2, 2012

Related U.S. Application Data

(63) Continuation of application No. 12/495,490, filed on Jun. 30, 2009, now Pat. No. 8,157,275, which is a continuation of application No. 11/471,059, filed on Jun. 19, 2006, now Pat. No. 7,559,561, which is a continuation of application No. 10/217,123, filed on Aug. 13, 2002, now Pat. No. 7,063,341, which is a continuation of application No. 09/816,311, filed on Mar. 26, 2001, now Pat. No. 6,431,567, which is a continuation of application No. 09/222,840, filed on Dec. 30, 1998, now Pat. No. 6,206,387.

(51) Int. Cl.
*B62M 1/00* (2010.01)
(52) U.S. Cl.
USPC .................................. 280/87.05; 280/87.041
(58) Field of Classification Search
USPC ........... 280/87.05, 87.041, 606, 14.27, 14.28, 280/655.1, 287
See application file for complete search history.

(56) References Cited

U.S. PATENT DOCUMENTS

| 1,297,282 | A | | 3/1919 | White |
| 1,391,312 | A | | 9/1921 | Gebhardt |
| 1,570,189 | A | | 1/1926 | Sturm |
| 1,658,068 | A | | 2/1928 | White |
| 1,687,953 | A | | 10/1928 | Starks |
| 1,968,975 | A | | 8/1934 | Upsacker et al. |
| 2,546,711 | A | * | 3/1951 | Amendt ..................... 280/87.05 |
| 3,396,928 | A | | 8/1968 | Lay |
| 4,144,822 | A | | 3/1979 | Roberts et al. |
| 4,584,735 | A | | 4/1986 | Garber |
| 4,707,884 | A | | 11/1987 | Chang |
| 4,735,392 | A | | 4/1988 | Farmer |
| 4,905,946 | A | | 3/1990 | Wang |
| 5,102,079 | A | | 4/1992 | Lee |
| 5,183,129 | A | | 2/1993 | Powell |
| 5,238,082 | A | * | 8/1993 | Stegeman et al. ............. 180/208 |
| 5,437,425 | A | | 8/1995 | Hou |
| 5,630,633 | A | | 5/1997 | Dupre et al. |
| 5,692,761 | A | | 12/1997 | Havlovitz |

(Continued)

*Primary Examiner* — Katy M Ebner
(74) *Attorney, Agent, or Firm* — Knobbe Martens Olson & Bear, LLP

(57) ABSTRACT

A collapsible skateboard includes an upright handle having lower portion on which is fixedly mounted a bracket, a connector having a curved slot having a lower end formed with a horizontal recess, an upper end formed with a vertical recess, and a circular hole under the vertical recess, an adjust pin inserted into the vertical recess of the connector and the elongated hole of the bracket, a pivot pin fitted through the circular hole of the connector and the circular hole of the bracket, a spring having an upper end connected to the adjust pin and a lower end to the pivot pin, and a platform on which is fixedly mounted the connector, whereby the skateboard can be easily folded up as desired.

8 Claims, 6 Drawing Sheets

U.S. PATENT DOCUMENTS

| | | |
|---|---|---|
| 5,816,614 A | 10/1998 | Kramer, Jr. et al. |
| 5,848,660 A * | 12/1998 | McGreen ................ 180/220 |
| 5,927,733 A | 7/1999 | Banda |
| 5,938,223 A | 8/1999 | Kotlier |
| 5,992,566 A | 11/1999 | Yeh |
| 6,120,044 A | 9/2000 | Tsai |
| 6,182,988 B1 | 2/2001 | Wu |
| 6,206,387 B1 | 3/2001 | Tsai |
| 6,431,567 B2 | 8/2002 | Tsai |

* cited by examiner

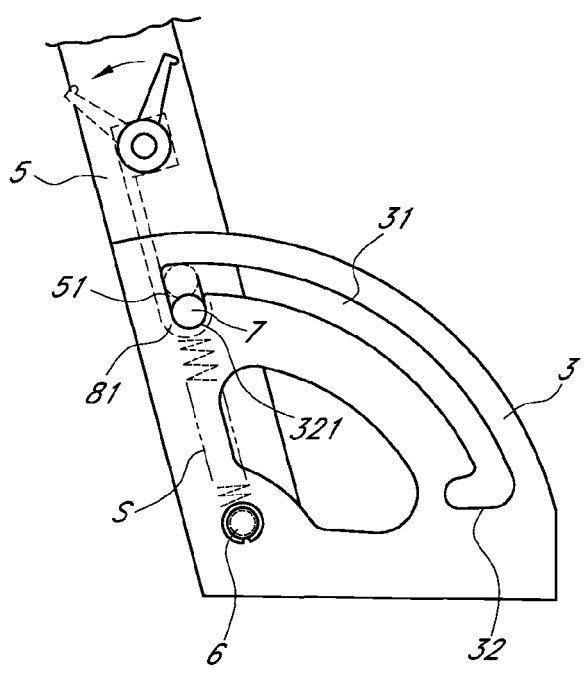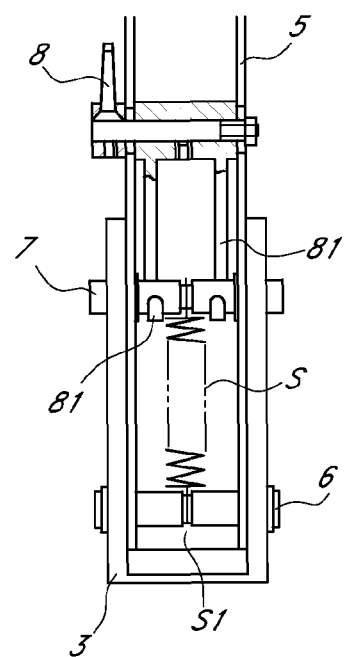
FIG. 6A
FIG. 6B

COLLAPSIBLE SKATEBOARD

RELATED APPLICATIONS

This application is a continuation of U.S. patent application Ser. No. 12/495,490, filed Jun. 30, 2009, pending, which is a continuation of U.S. patent application Ser. No. 11/471,059, filed Jun. 19, 2006, now U.S. Pat. No. 7,559,561, which is a continuation of U.S. patent application Ser. No. 10/217,123, filed Aug. 13, 2002, now U.S. Pat. No. 7,063,341, which is a continuation of U.S. patent application Ser. No. 09/816,311, filed Mar. 26, 2001, now U.S. Pat. No. 6,431,567, which is a continuation of U.S. patent application Ser. No. 09/222,840, filed Dec. 30, 1998, now U.S. Pat. No. 6,206,387, the entireties of which are incorporated by reference herein and made a part of the present disclosure.

BACKGROUND OF THE INVENTION

1. Field of the Invention

This invention is related to an improvement in the structure of a collapsible skateboard.

2. Description of the Related Art

The conventional skateboard with an upright handle is fixed in structure so that it is difficult to carry. Hence, a collapsible skateboard has been developed to obviate this drawback. However, such a collapsible skateboard is complicated in structure and expensive in cost. Furthermore, the handle of the collapsible skateboard cannot be kept at a fixed position, thereby making it inconvenient to use.

SUMMARY OF THE INVENTION

Therefore, it is an object of the present invention to provide an improved collapsible skateboard which can obviate and mitigate the above-mentioned drawbacks.

This invention is related to an improvement in the structure of a collapsible skateboard.

It is the primary object of the present invention to provide a collapsible skateboard that includes an upright handle having lower portion on which is fixedly mounted a bracket, a connector having a curved slot having a lower end formed with a horizontal recess, an upper end formed with a vertical recess, and a circular hole under the vertical recess, an adjust pin inserted into the vertical recess of the connector and the elongated hole of the bracket, a pivot pin fitted through the circular hole of the connector and the circular hole of the bracket, a spring having an upper end connected to the adjust pin and a lower end to the pivot pin, and a platform on which is fixedly mounted the connector.

It is another object of the present invention to provide a collapsible skateboard wherein the connection is a U-shaped member having two upwardly extending lugs each formed with the curved slot.

It is still another object of the present invention to provide a collapsible skateboard further comprising a control mechanism which includes a cylindrical member pivotally mounted on the bracket and having an end extending out of the bracket to fixedly connect with a lever and a hook extending downwardly within the bracket to engage with the adjust pin.

It is still another object of the present invention to provide a collapsible skateboard which can be easily folded as desired.

It is a further object of the present invention to provide a collapsible skateboard which is simple in construction.

BRIEF DESCRIPTION OF THE DRAWINGS

FIGS. 6A and 6B illustrate another preferred embodiment of the present invention.

DETAILED DESCRIPTION OF THE PREFERRED EMBODIMENTS

Figure 1:
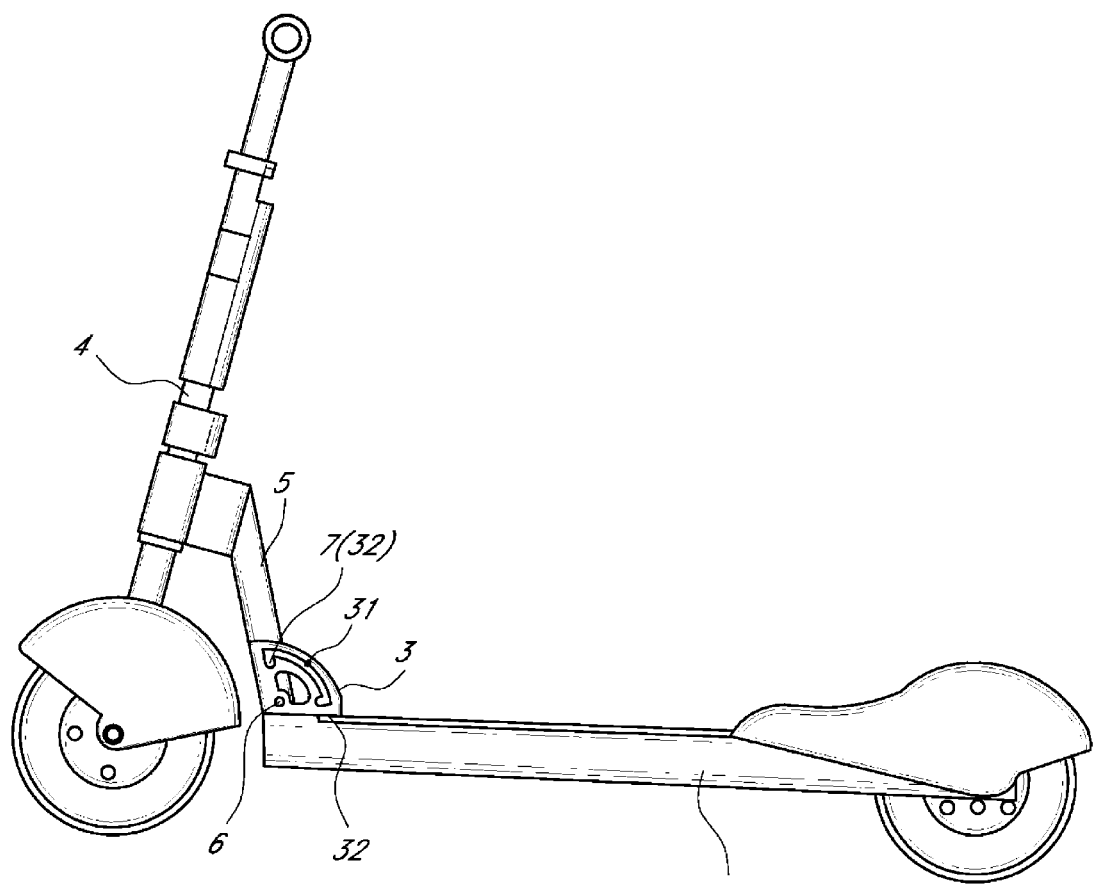
FIG. 1 is a side view of the present invention.
Figure 2:
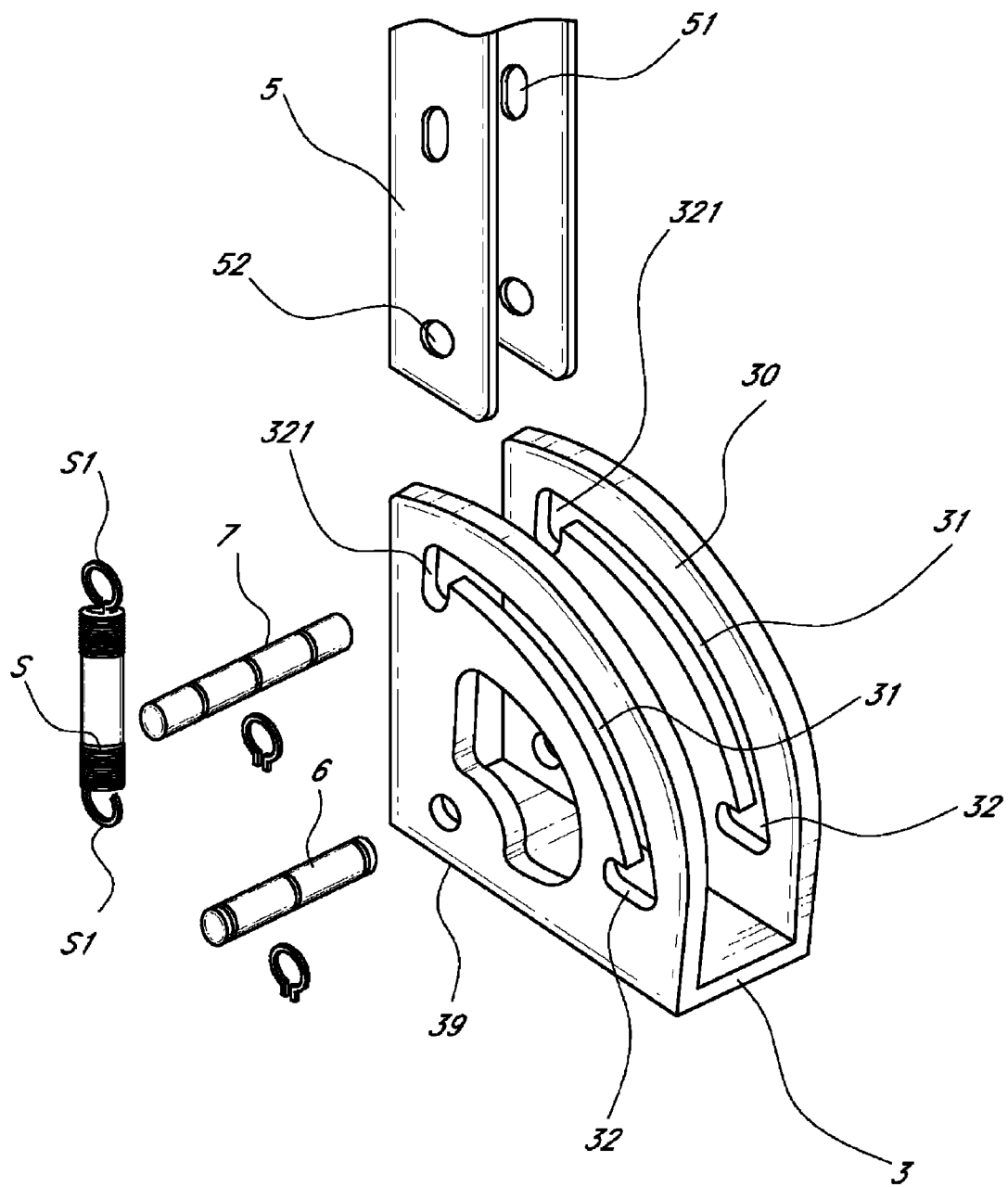
FIG. 2 is an exploded view of the present invention.
Figure 3:
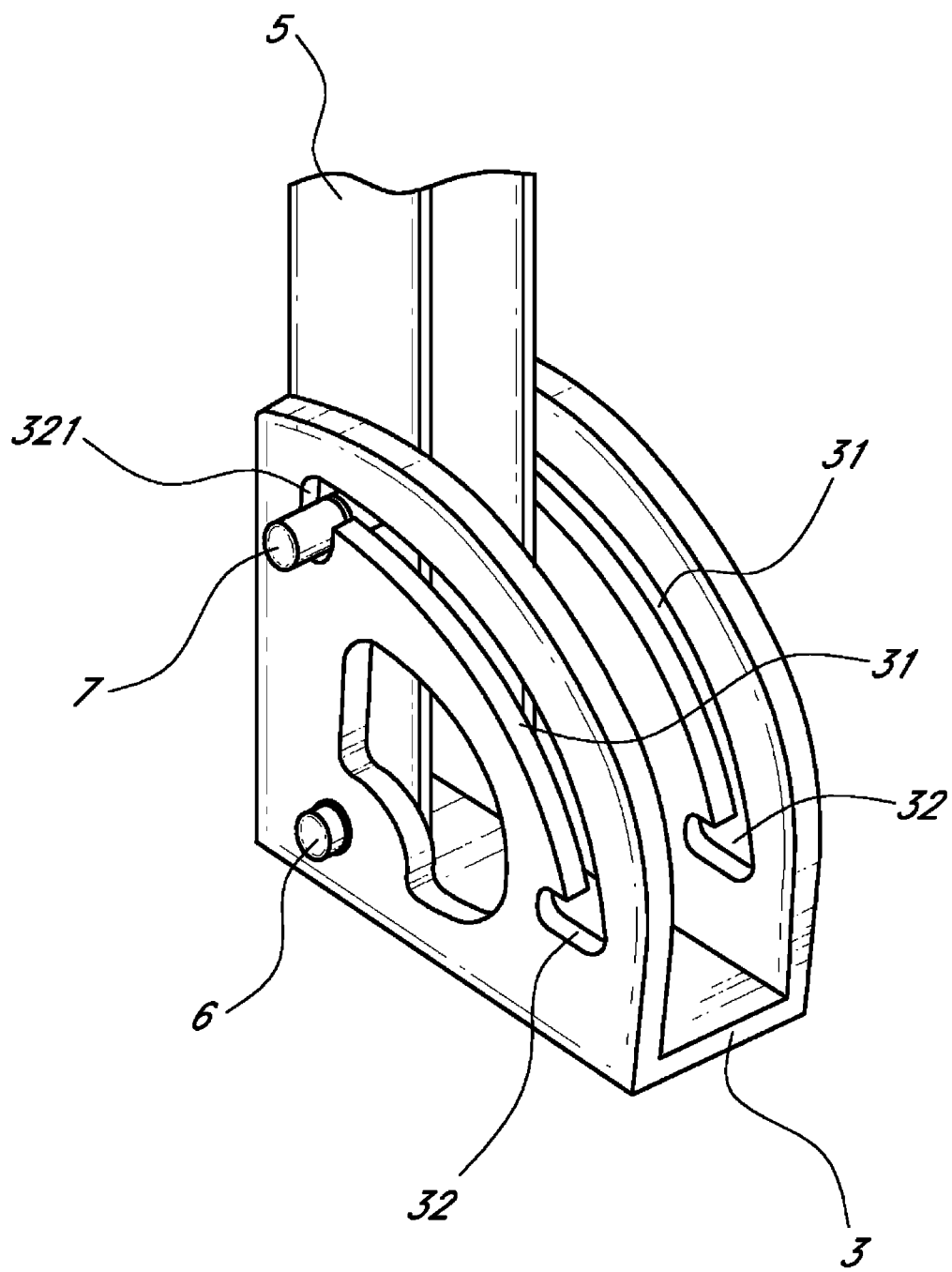
FIG. 3 is a perspective view of the present invention.
Figure 4:
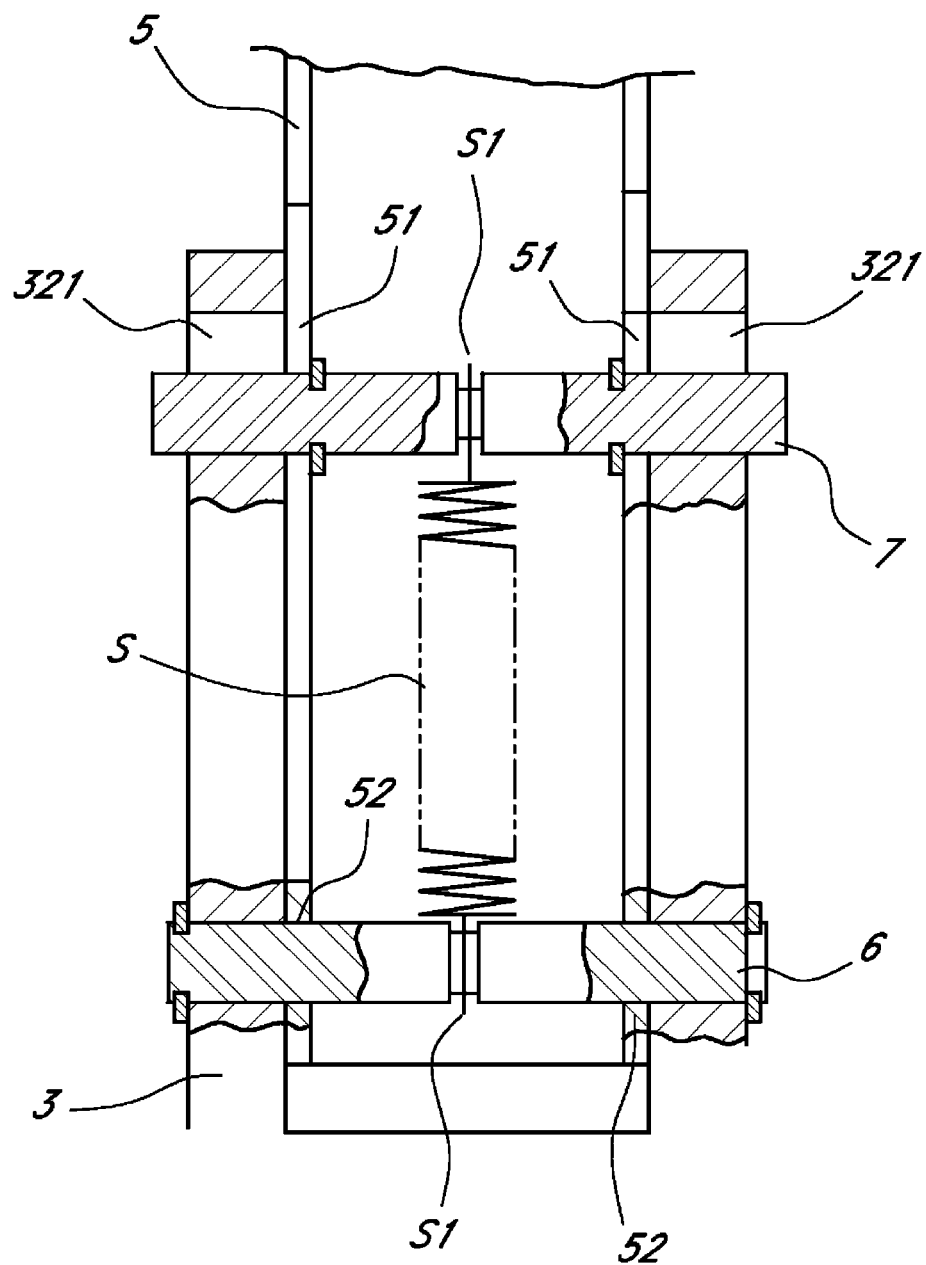
FIG. 4 is a sectional view of the present invention.

Referring to FIGS. 1, 2 and 3, the collapsible skateboard according to the present invention generally comprises an upright handle 4, a bracket 5, a connector 3 and a platform 2. The bracket 5 is fixedly mounted on the handle 4 and provided with two legs 5 extending downwardly toward the platform 2. Each leg 5 has an elongated hole 51 and a circular hole 52 below the elongated hole 51. The connector 3 is formed with two upwardly extending lugs 30 configured to receive the two legs 5 therein. Each of the lugs 30 has a curved slot 31 formed with a horizontal recess 32 at the lower end and a vertical recess 321 at the upper end. Each lug 30 is further formed with a circular hole 39 below the vertical recess 321. An adjust sin 7 is inserted into the vertical recesses 321 of the connector 3 and the elongated holes 51 of the bracket 5. A pivot pin 6 is fitted through the circular holes 39 of the connector 30 and the circular holes 52 of the bracket 5 so that the handle 4 together with the bracket 5 can be folded on the platform 2. A spring S has an upper end S1 connected to the intermediate portion of the adjust pin 7 and a lower end connected to the intermediate portion of the pivot pin 6 so that the adjust pin 7 will be retained within the vertical recess 5321 thereby keeping the handle 4 at an upright position.

Figure 5:
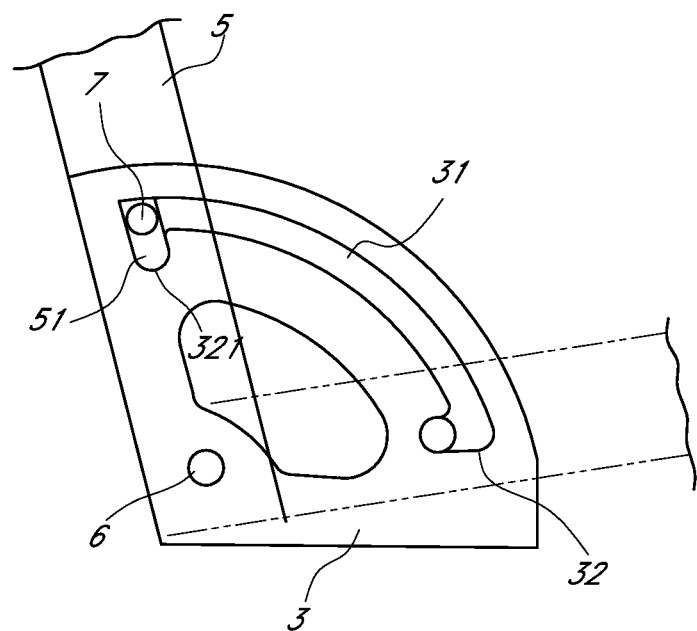
FIG. 5 illustrates the working principle of the present invention.

When desired to fold the skateboard, it is only necessary to move the adjust pin 7 upwardly out of the vertical recesses 321 and then move the handle 4 together with the bracket 5 toward the platform 2 so that the adjust pin 7 is moved along the curved slots 31 to engage with the horizontal recesses 32 (see FIG. 5). When in use, simply move the handle 4 along the direction away from the platform 2 so that the adjust pin 7 is moved along the curved slots 31 to engage with the vertical recesses 321.

FIGS. 6A and 6B illustrate another preferred embodiment of the present invention. As shown, a control mechanism 8 is pivotally mounted on the bracket 5 and arranged above the adjust pin 7. The control mechanism 8 includes a cylindrical member pivotally mounted on the bracket 5 and having an end extending out of the bracket 5 to fixedly connect with a lever 8 and a hook 81 extending downwardly within the bracket 5 to engage with the adjust pin 7, so that the adjust pin 7 can be moved upwardly out 5 of the vertical recesses 321 by turning the lever 8 thereby enabling the handle 4 to fold on the platform 2 as desired.

Other objects of the invention will in part be obvious and in part hereinafter pointed out.

The invention accordingly consists of features of constructions and method, combination of elements, arrangement of parts and steps of the method which will be exemplified in the constructions and method hereinafter disclosed, the scope of the application of which will be indicated in the claims following.

What is claimed is:

1. A collapsible scooter, comprising:
 a frame, comprising:
  a first portion comprising a handle and supporting a front wheel;
  a second portion supporting a rear wheel, wherein said first portion and said second portion are rotatably coupled for relative movement between a collapsed position and an operable position;

a surface comprising a first recess and a second recess associated with one of said first portion and said second portion;

a movable pin associated with said other of said first portion and said second portion and oriented parallel to an axis of rotation between said first portion and said second portion, said movable pin movable independently of said other of said first portion and said second portion and positionable into engagement with said first recess to secure said collapsible scooter in said collapsed position and positionable into engagement with said second recess to secure said collapsible scooter in said operable position; and a control mechanism that is capable of moving said movable pin to release said movable pin from said first recess and to release said movable pin from said second recess, wherein said control mechanism converts a rotational motion of a lever of said control mechanism into a linear motion of said movable pin;

a spring having a first end coupled to said movable pin, said springy configured to normally bias said movable pin into engagement with one of said first and second recesses when said collapsible scooter is in a respective one of said collapsed and operable positions; and wherein an outer surface of said movable pin defines a groove configured to accommodate said first end of said spring;

wherein said first portion and said second portion are rotatably coupled by a pivot pin, and a second end of said spring is coupled to said pivot pin.

2. The collapsible scooter of claim 1, wherein said movable pin is movable within an elongate slot defined by said frame.

3. The collapsible scooter of claim 1, wherein said movable pin moves in a radial direction relative to said axis of rotation into engagement with said first and second recesses.

4. The collapsible scooter of claim 1, wherein an outer surface of said pivot pin defines a groove configured to accommodate said second end of said spring.

5. A collapsible scooter, comprising:
a first portion comprising a handle and supporting a front wheel;
a second portion supporting a rear wheel, wherein said first portion and said second portion are rotatably coupled for relative movement between a collapsed position and an operable position;
a pin supported by said first portion;
a hook that extends at least partially around a circumference of said pin in said collapsed position of said scooter; and
a lever coupled to said hook, wherein said lever is configured to move said hook to permit said collapsible scooter to move from said collapsed position to said operable position;
wherein said pin is movable relative to the first portion and a direction of movement of said pin is perpendicular to a longitudinal axis of said pin.

6. The collapsible scooter of claim 5, wherein said hook is configured to rotate with rotation of said lever.

7. The collapsible scooter of claim 5, wherein said lever and said hook are supported by said first portion of said collapsible scooter.

8. The collapsible scooter of claim 5, further comprising a spring having a first end coupled to said pin, the second portion including a recess, and said spring configured to normally bias said pin in a direction tending to engage said pin with said recess.

* * * * *